United States Patent Office 3,297,628
Patented Jan. 10, 1967

3,297,628
STABILIZATION OF RUBBER WITH DICYCLO-
HEXYLDIAMINODIPHENYL ETHER
Henryk A. Cyba, Evanston, Ill., assignor to Universal Oil
Products Company, Des Plaines, Ill., a corporation of
Delaware
No Drawing. Filed Mar. 10, 1965, Ser. No. 438,789
5 Claims. (Cl. 260—45.9)

This application relates to the stabilization of rubber against oxidative deterioration.

It is well known that rubber during storage, shipment and use deteriorates due to the action of oxygen. This results in loss of valuable properties including, for example, elastic properties, tensile strength, etc. In accordance with the present invention, such oxidative deterioration is retarded by incorporating in the rubber a novel antioxidant as will be hereinafter described in detail.

The present invention is used for the stabilization of any rubber which normally undergoes oxidative deterioration. The rubber may be of natural or synthetic origin. Synthetic rubbers include those produced by the reaction of styrene and butadiene (SBR), butadiene and acrylonitrile (Buna N), isoprene and isobutylene (Butyl rubber), etc., as well as reclaims and latices of rubbery materials, whether or not admixed with fillers, pigments, accelerating agents, etc. Natural rubbers include Hevea rubber, caoutchouc, balata, gutta percha, etc. The rubbers hereinbefore set forth are those most commonly in use at the present time. However, it is understood that the use of the novel antioxidant of the present invention is not limited to these particular rubbers but may be used in any rubber which undergoes deterioration upon exposure to oxygen.

It is understood that the rubber differs importantly from other solid condensation or polymeric products. These differences are in the composition, method of manufacture and properties. The rubber composition includes ingredients conventionally incorporated in the rubber to give it the desired properties of elasticity, resiliency, etc. The rubber formulation must be cured in order to impart these desired properties. The particular ingredients and the particular method of manufacture produce the rubber product meeting these requirements.

In one embodiment the present invention relates to a method of stabilizing rubber against oxidative deterioration which comprises incorporating therein a stabilizing concentration of dicyclohexyldiaminodiphenyl ether.

In a specific embodiment the present invention relates to a method of stabilizing rubber against oxidative deterioration which comprises incorporating therein from 0.1% to about 5% by weight of 4,4'-dicyclohexyldiaminodiphenyl ether.

Any suitable dicyclohexyldiaminodiphenyl ether is used in accordance with the present invention. Of especial effectiveness, and accordingly particularly preferred, is 4,4'-dicyclohexyldiaminodiphenyl ether. In another embodiment the antioxidant is 2,4'-dicyclohexyldiaminodiphenyl ether. In still another embodiment the antioxidant is 2,2'-dicyclohexyldiaminodiphenyl ether. Generally, however, 4,4'-dicyclohexyldiaminodiphenyl ether and 2,4'-dicyclohexyldiaminodiphenyl ether are preferred because of the higher activity for the purpose.

The dicyclohexyldiaminodiphenyl ether is prepared in any suitable manner. In a preferred method, it is prepared by the reductive alkylation of oxydianiline with cyclohexanone. For example, 4,4'-dicyclohexyldiaminodiphenyl ether is prepared by the reductive alkylation of one mole proportion of 4,4'-diaminodiphenyl ether with two mole proportions of cyclohexanone.

The reductive alkylation is effected in any suitable manner. In a preferred embodiment this reaction is effected at an elevated temperature of from about 100–250° C. and a hydrogen pressure of from about 5 to about 200 atmospheres. Any suitable catalyst may be used. One catalyst comprises a mixture of the oxides of chromium, copper and barium. Another catalyst comprises a composite of platinum and alumina. Still other catalysts include those containing nickel, cobalt, palladium, molybdenum, etc.

The antioxidant of the present invention is incorporated in rubber or rubbery products in any suitable manner and at any suitable stage of preparation. In general, the antioxidant is utilized in a concentration of from about 0.1% to about 5% by weight of the rubber, although lower concentrations down to 0.001% or higher concentrations up to 10% may be used when advantages appear therefor. These concentrations are based on the rubber hydrocarbon exclusive of the other components of the final rubber composition, and are used in this manner in the present specification and claims.

It is understood that the antioxidant of the present invention may be used along with the other additives incorporated in rubber for specific purposes including accelerators, softeners, extenders, wax, reinforcing agents, etc.

As hereinbefore set forth, the antioxidant of the present invention is used in any rubber subject to oxidative deterioration. The antioxidant preferably is incorporated in the rubber composition during milling thereof and prior to vulcanization. In another embodiment the antioxidant may be sprayed or dusted on vulcanized rubber products or the antioxidant is formed as a solution in a suitable solvent and the solution then is sprayed or poured onto vulcanized rubber products, or the vulcanized rubber products are soaked, dipped, suspended or otherwise contacted with the antioxidant.

The following examples are introduced to illustrate further the novelty and utility of the present invention but not with the intention of unduly limiting the same.

*Example 1.*—The antioxidant of this example is 4,4'-dicyclohexyldiaminodiphenyl ether. It was utilized as an antioxidant in natural rubber of the following recipe:

TABLE I

| Component: | Parts by wt. |
|---|---|
| Smoked sheet | 100.0 |
| HAF black | 45.0 |
| Zinc oxide | 3.1 |
| Stearic acid | 3.0 |
| Sulfur | 2.5 |
| Santocure (N - cyclohexyl - 2 - benzothiazole-sulfenamide) | 0.75 |
| Antioxidant, as indicated. | |

The rubber was cured for 40 minutes at 140° C.

The rubber was evaluated in the test-tube aging procedure corresponding to ASTM D–52T. In general, this method comprises placing dumbbell specimens of the rubber in a test tube which is immersed in a constant temperature bath. Two long tubes are inserted in the stopper of the test tube, one positioned several inches higher than the other, the latter extending to the bottom of the sample tube. This serves to admit fresh cooler air, while gently replacing the heated air by exhausting the same through the higher tube.

The following table reports results of evaluating a sample of the rubber without antioxidant and samples of the rubber containing one part and two parts per 100 parts of rubber by weight of 4,4'-dicyclohexyldiaminodiphenyl ether. These tests were conducted at 90° C., with sample tubes being removed periodically over a time of 7 days. The samples then were evaluated in the conventional manner. The following table reports the more pertinent data of tensile strength, percent elongation at break and moduli.

TABLE II

| Additive | Days of Exposure to Air | Tensile Strength, p.s.i. | Elongation at Break, Percent | Modulus | |
|---|---|---|---|---|---|
| | | | | 200% p.s.i. | 300% p.s.i. |
| None | 0 | 3,590 | 380 | 1,680 | 2,800 |
| | 1 | 2,255 | 250 | 1,800 | |
| | 2 | 1,710 | 205 | 1,550 | |
| | 4 | 975 | 190 | 830 | |
| | 7 | 735 | 130 | | |
| 1% of 4,4'-dicyclohexyl-diamino diphenyl ether. | 0 | 3,570 | 360 | 1,665 | 2,875 |
| | 1 | 3,395 | 305 | 2,025 | 3,245 |
| | 2 | 3,320 | 300 | 2,060 | 3,340 |
| | 4 | 3,080 | 275 | 2,205 | |
| | 7 | 2,395 | 205 | 2,330 | |
| 2% of 4,4'-dicyclohexyl-diamino diphenyl ether. | 0 | 3,605 | 390 | 1,500 | 2,645 |
| | 1 | 3,525 | 340 | 1,815 | 3,100 |
| | 2 | 3,420 | 310 | 1,985 | 3,305 |
| | 4 | 3,380 | 305 | 2,085 | 3,305 |
| | 7 | 3,020 | 270 | 2,140 | |

From the data in the above table, it will be seen that in the first series of runs, made with the rubber not containing the antioxidant, the tensile strength fell from 3590 to 735 p.s.i., thus showing considerable deterioration during the 7 days exposure to oxygen. Also, the elongation at break fell from 380% to 130% during such time. The 200% modulus fell from 1680 to 830 p.s.i. within 4 days. The figures for 300% modulus after exposure to oxygen could not be obtained because the rubber sample broke.

In contrast to the above, it will be noted that the sample of rubber containing one part by weight of 4,4'-dicyclohexyldiaminodiphenyl ether decreased in tensile strength after seven days to only 2395 p.s.i., elongation at break to only 205% and that the moduli at both 200% and 300% were considerably improved. In the sample containing two parts by weight of 4,4'-dicyclohexyldiaminodiphenyl ether, the tensile strength after seven days was 3020 p.s.i., the elongation at break was 270% and the moduli also were considerably improved. Thus it will be seen that the antioxidant was very effective in retarding deterioration of the rubber.

*Example III.*—The antioxidant of this example is 2,4'-dicyclohexyldiaminodiphenyl ether and was evaluated in another sample of the rubber recipe described in Example I and in the same method set forth therein. The antioxidant also was used in concentrations of one part and two parts per 100 parts of rubber by weight. The results of these evaluations are shown in the following table. For ready comparison the following table also repeats the results of the blank or control sample of the rubber not containing the antioxidant.

Here again, it will be noted that the antioxidant retarded oxidative deterioration of the rubber. In this particular rubber, the 2,4'-dicyclohexyldiaminodiphenyl ether was not quite as effective as the 4,4'-dicyclohexyldiaminodiphenyl ether of Example I but it did considerably retard deterioration of the rubber during the exposure to oxygen.

*Example III.*—The antioxidant of this example also was evaluated in a styrene-butadiene rubber. The rubber is of standard recipe and contains the usual ingredients of carbon black, zinc oxide, stearic acid, sulfur, etc. However, the method of testing used in this example is different from the method described in Example I. In general, the method used in this example involves exposing samples of the rubber to infrared at 150° C. and determining carbonyl number. The time required to reach a specified carbonyl number is taken as the induction period. Accordingly, the less stable sample of rubber reaches the induction period in a shorter period of time. Contrawise, a sample of the rubber which resists deterioration will require a longer period of time to reach the induction period. This method is described in "Analytical Chemistry," volume 33, page 456, March 1961.

A blank or control sample of the rubber, not containing the antioxidant, reaches the induction period within 50 minutes. In contrast, a sample of the same rubber containing 1¼ parts of antioxidant per 100 parts of the rubber by weight did not reach the induction period until 1520 minutes. Thus, it is seen that the antioxidant was very effective in retarding deterioration of the rubber.

For comparative purposes, it may be mentioned that another sample of the same rubber containing a commercial antioxidant believed to be the reaction product of diphenylamine and acetone, when evaluated in the same manner, had an induction period of less than 700 minutes. It will be noted that the antioxidant of the present invention was more than twice as effective in extending the induction period of the rubber when evaluated in the above manner.

TABLE III

| Additive | Days of Exposure to Air | Tensile Strength, p.s.i. | Elongation at Break, Percent | Modulus | |
|---|---|---|---|---|---|
| | | | | 200% p.s.i. | 300% p.s.i. |
| None | 0 | 3,590 | 380 | 1,680 | 2,800 |
| | 1 | 2,255 | 250 | 1,800 | |
| | 2 | 1,710 | 205 | 1,550 | |
| | 4 | 975 | 190 | 830 | |
| | 7 | 735 | 130 | | |
| 1% of 2,4'-dicyclohexyl-diaminodiphenyl ether. | 0 | 3,525 | 370 | 1,585 | 2,740 |
| | 1 | 3,310 | 325 | 1,875 | 3,070 |
| | 2 | 3,060 | 285 | 1,955 | |
| | 4 | 2,765 | 265 | 1,930 | |
| | 7 | 1,880 | 215 | 1,790 | |
| 2% of 2,4'-dicyclohexyl-diaminodiphenyl ether. | 0 | 3,535 | 385 | 1,520 | 2,625 |
| | 1 | 3,465 | 335 | 1,885 | 3,090 |
| | 2 | 3,175 | 305 | 1,940 | 3,180 |
| | 4 | 2,925 | 275 | 2,035 | |
| | 7 | 2,175 | 210 | 1,990 | |

I claim as my invention:

1. Diene hydrocarbon rubber normally subject to oxidative deterioration containing, as an inhibitor against said deterioration, a stabilizing concentration of dicyclohexyldiaminodiphenyl ether.

2. Diene hydrocarbon rubber normally subject to oxidative deterioration containing, as an inhibitor against said deterioration, a stabilizing concentration of 4,4'-dicyclohexyldiaminodiphenyl ether.

3. Diene hydrocarbon rubber normally subject to oxidative deterioration containing, as an inhibitor against said deterioration, a stabilizing concentration of 2,4'-dicyclohexyldiaminodiphenyl ether.

4. A composition as defined in claim 1 further characterized in that said diene rubber is natural rubber.

5. A composition as defined in claim 1 further characterized in that said diene rubber is styrene-butadiene rubber.

References Cited by the Examiner

UNITED STATES PATENTS

| | | | |
|---|---|---|---|
| 1,815,072 | 7/1931 | Reed | 260—808 |
| 2,097,474 | 11/1937 | Semon | 260—808 |
| 2,128,944 | 9/1938 | Jones | 260—45.9 |
| 3,063,962 | 11/1962 | Cyba | 260—45.9 |

LEON J. BERCOVITZ, *Primary Examiner.*

H. E. TAYLOR, *Assistant Examiner.*